UNITED STATES PATENT OFFICE 3,433,387
Patented Mar. 18, 1969

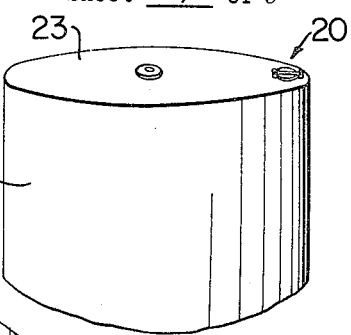
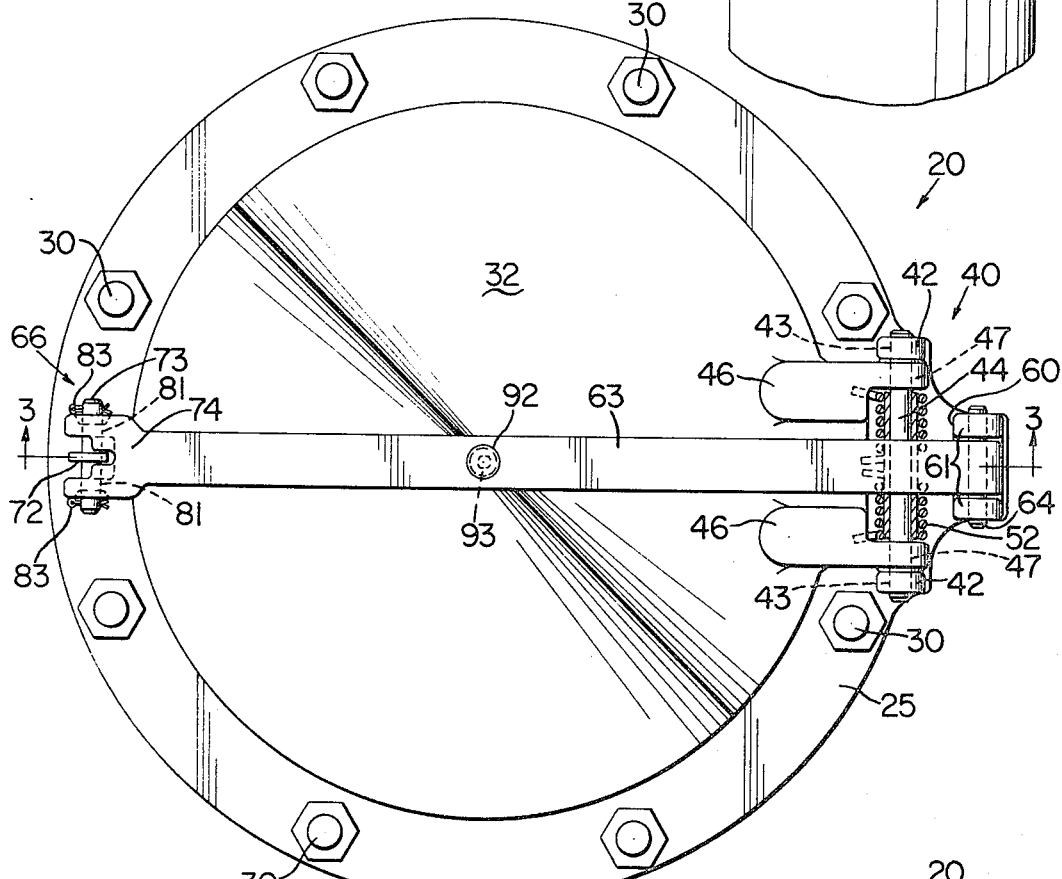
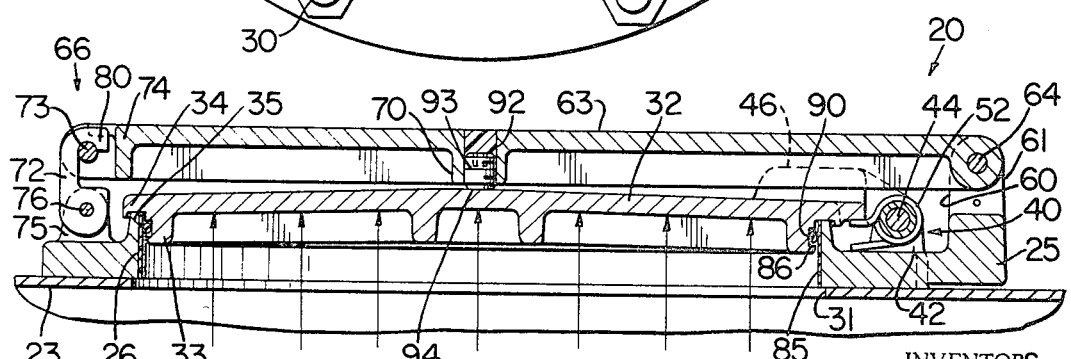

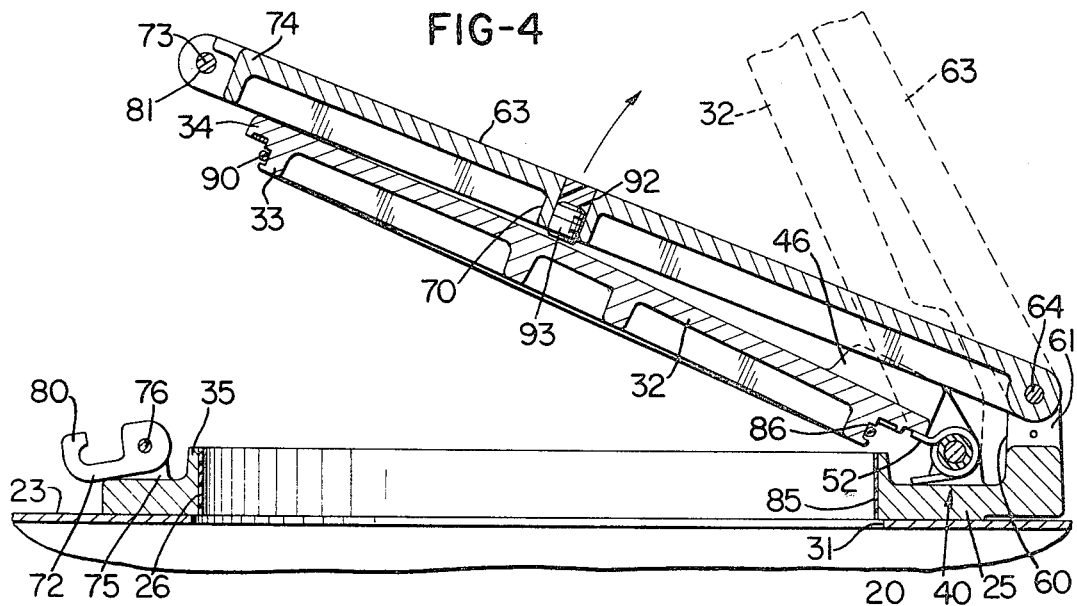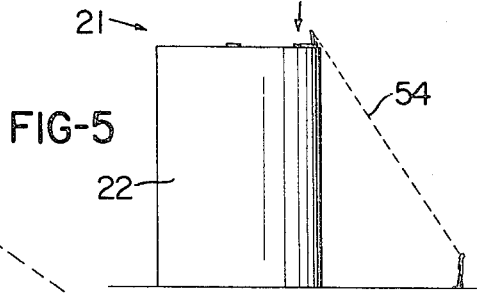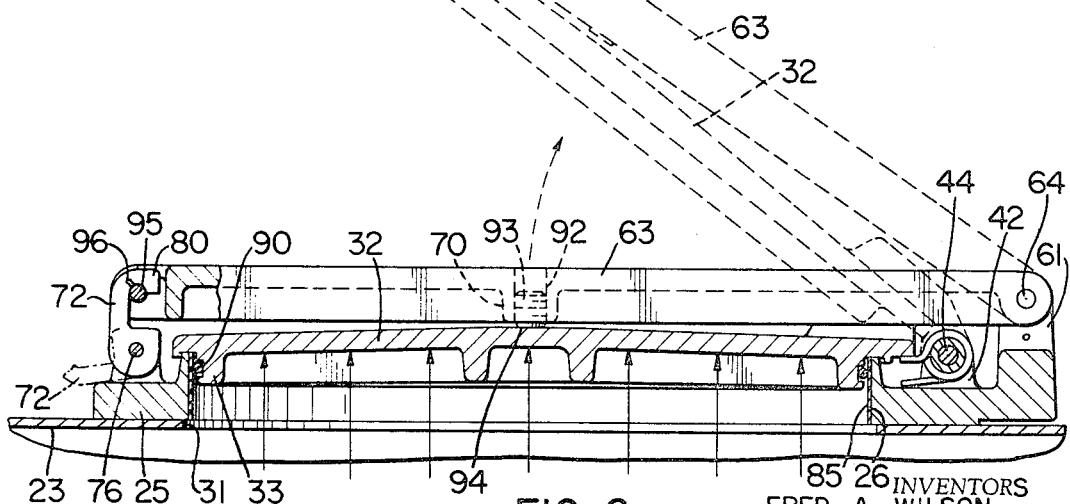

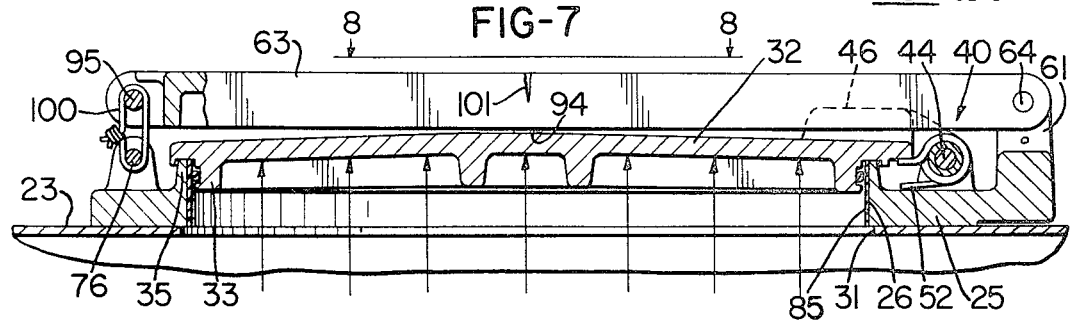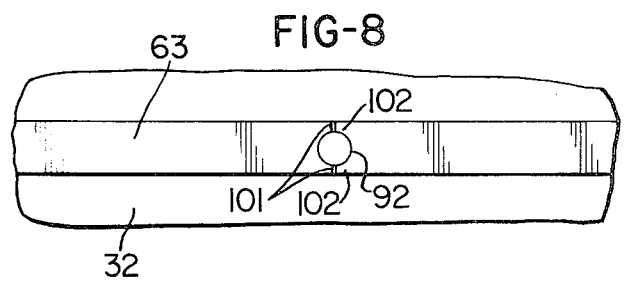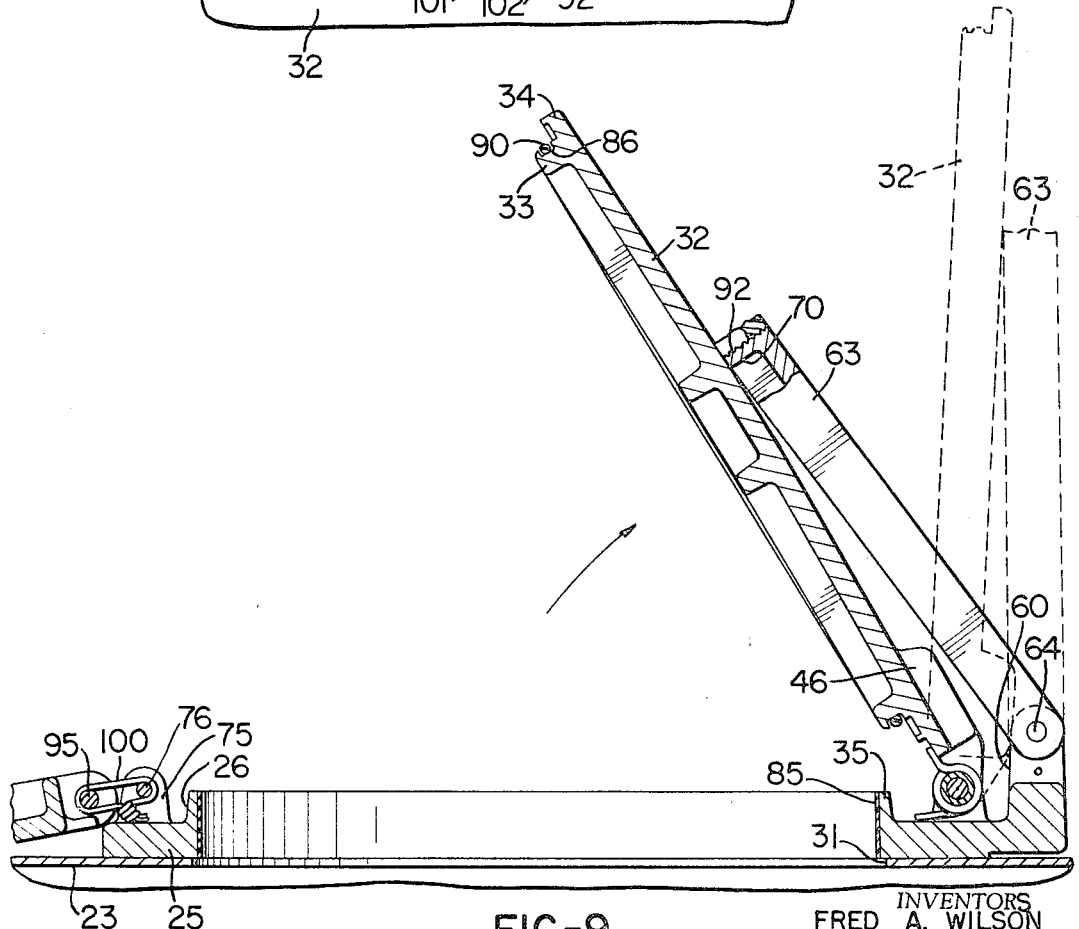

3,433,387
BREAKABLE ATTACHING MEANS FOR
A VENT CLOSURE
Fred A. Wilson, Erlanger, Ky., and Glenn E. Moore,
Fairfield, Ohio, assignors to Dover Corporation,
Cincinnati, Ohio, a corporation of Delaware
Filed Feb. 1, 1967, Ser. No. 613,247
U.S. Cl. 220—89                                8 Claims
Int. Cl. B65d 25/00

ABSTRACT OF THE DISCLOSURE

This disclosure relates to a fluid pressure operated emergency vent device for a fluid tank having a comparatively large area vent extending therethrough and cover means for normally sealing such vent under normal conditions and having substantially foolproof breakable attaching means for attaching such cover in its normally sealed position where such attaching means breaks to relieve such tank in the event of excessive pressure therewithin.

---

This invention relates to vent devices and more particularly to a fluid pressure operated emergency vent device.

Many flammable liquids including flammable liquids having a comparatively low vapor pressure, for example, are often stored in bulk storage tanks which are vented to atmosphere. In the event such a flammable liquid within a given storage tank becomes unduly heated it gives off considerable vapors within the tank which must be relieved to prevent such storage tank from rupturing. Particularly in the case of excessive heating due to a fire it is very important that the tank be immediately relieved with a sufficiently large area vent to prevent rupture and spread of the fire over a wide area.

Although, storage tanks for flammable liquids have small vents which are provided to take care of normal atmospheric changes, such small vents are not adequate to handle the large quantity of vapors given off by a flammable liquid due to heating caused by a fire. Further, it is exceedingly important that the vent provided be foolproof in operation to assure that even in the event of improper reclosing of such emergency vent by field personnel, a sufficiently large area emergency vent is always provided in the event of a subsequent excessive pressure buildup within the particular storage tank.

Accordingly, it is a feature of this invention to provide an improved emergency vent device of simple and economical construction and which will provide its venting function even in the event of compounded error by personnel using such emergency vent device.

Another feature of this invention is to provide such vent device having a comparatively large area vent provided with inexpensive cover means for sealing such vent under normal conditions.

Another feature of this invention is to provide a plurality of breakable attaching means for holding such cover means closed under normal conditions and wherein such attaching means breaks to provide a large area vent in the event of excessive pressure in an associated storage tank.

Another feature of this invention is to provide an emergency vent device of the character mentioned in which such cover means is hinged along a side edge thereof and provided with urging means to hold such cover means transverse to its closed position and thereby present a large area viewing surface to indicate a high pressure condition has been previously relieved within the associated storage tank.

Another feature of this invention is to provide an emergency vent device of the character mentioned which utilizes frictionless lining means to assure such cover means is free to move as a function of pressure within its associated storage tank and free of corrosive and/or adhesive sticking, or the like.

Another feature of this invention is to provide an improved emergency vent device of the character mentioned which is easily assembled without requiring precision mating of component parts.

Therefore, it is an object of this invention to provide an emergency vent device having one or more of the novel features of this invention as set forth above or hereinafter shown or described.

Other objects, uses and advantages of this invention are apparent from a reading of this description which proceeds with reference to the accompanying drawings forming a part thereof and wherein:

FIGURE 1 is a fragmentary perspective view illustrating a bulk storage tank having an exemplary emergency vent device of this invention installed on its top surface.

FIGURE 2 is an enlarged plan view of such exemplary vent device.

FIGURE 3 is a sectional view on the line 3—3 of FIGURE 2.

FIGURE 4 is a sectional view illustrating breakable pin means broken by excessive pressure within the storage tank of FIGURE 1 to cause hinged cover means comprising such vent device to open in a hinged manner about suitable hinge means provided for such cover means.

FIGURE 5 is a side elevation illustrating the positioning of the improved vent device of this invention on the top surface of the bulk storage tank of FIGURE 1 so that with the cover means held open after an emergency high pressure condition within such storage tank such cover means can be easily seen by an observer standing at ground level.

FIGURE 6 is a fragmentary sectional view similar to FIGURE 4 of the drawings illustrating the manner in which a breakable attaching link means is broken in the event of error by a using operator in reclosing the hinged cover means after excessive pressure buildup within such tank.

FIGURE 7 is a fragmentary sectional view similar to FIGURE 3 of the drawings wherein breakable pin means and breakable attaching link means for the cover means of such vent device have been improperly replaced by wiring the cover means closed and showing the manner in which an elongated breakable bar means which holds such cover means closed starts to break due to subsequent excessive pressure buildup within such bulk storage tank.

FIGURE 8 is a plan view illustrating a fragmentary portion of the breakable bar used to hold the cover means, as shown in FIGURE 7, in position and showing such bar starting to fracture across a reduced area section provided in its central portion.

FIGURE 9 is a fragmentary sectional view similar to FIGURE 6 and showing the hinged cover means swinging vertically upwardly after such elongated bar has broken.

While the various features of this invention are hereinafter illustrated and described as being particularly adaptable for providing an improved fluid pressure operated emergency vent device for use in a bulk storage tank containing flammable liquids, or the like, it is to be understood that the various features of this invention can be utilized singly or in any combination thereof to provide an improved vent device for other uses as desired.

Therefore, this invention is not to be limited to only the embodiments illustrated in the drawings, because the drawings are merely utilized to illustrate one example of the wide variety of uses of this invention.

In the exemplary embodiment of this invention illustrated in the drawings an emergency vent device designated by the numeral 20 is shown. Vent device 20 of this example is used on a bulk storage tank designated generally by the numeral 21 and comprising a cylindrical side wall 22 and a top wall 23. Storage tank 21 of this exmple is particularly constructed to contain flammable liquids having a low vapor pressure. Emergency vent device 20 is preferably installed adjacent the outer periphery of top wall 23 in close proximity to cylindrical side wall 22 for reasons as will be explained hereinafter.

As seen particularly in FIGURES 2 and 3 of the drawings, vent device 20 has housing means shown as a housing 25 which has bore means shown in this example as a right circular cylindrical bore 26 extending therethrough and devning a comparatively large area emergency vent.

Fastening means is provided for fastening vent device 20 to top wall 23 of storage tank 21 and such fastening means comprises a plurality of bolts each designated by the numeral 30 and only a representative few have been so designated. Bolts 30 extend through housing 25 and fasten vent device 20 over an associated opening 31 in top wall 23 so that vent device 20 has its large area vent 26 in flow communication with the interior of storage tank 21.

Cover means shown as a cover 32 is provided for sealing large area vent 26 under normal operating conditions and in this example of the invention such cover comprises a substantially disk-like cover having a downwardly extending substantially cylindrical flange 33 and an outwardly projecting lip designated by the numeral 34 extending beyond cylindrical flange 33 and adapted to rest on the top peripheral edge of housing 25 at the entrance of bore or vent 26. Cover 32 is placed over large area vent 26 so that its projecting lip 34 is supported on an upwardly projecting portion 35 of housing 25 and cover 32 is held in its normally closed position by breakable attaching means which attach cover 32 in sealed relation over vent.

The breakable attaching means for holding cover 32 in position is adapted to break in a brittle manner in the event of excessive pressure buildup within storage tank 21 as will be explained subsequently in more detail. Upon breaking of such attaching means cover 32 moves away from vent 26 to provide a large area emergency vent and relieve the pressure buildup within storage tank 21.

The breakable attaching means comprises a plurality of breakable attaching means which are constructed and arranged in such a manner that even with a compounding of error in the attachment of cover 32 by operators using emergency vent 20 a large area emergency vent is always assured for storage tank 21 without danger of bursting such storage tank.

Vent device 20 has hinge means for attaching cover 32 to housing 25 in a hinged manner and such hinge means comprises hinge means designated generally by the numeral 40. Hinge means 40 is adapted to attach cover 32 to housing 25 in a hinged manner at a first position adjacent a side edge of cover 32.

Hinge means 40 comprises a pair of upwardly projecting lugs each designated by the numeral 42 and each lug has an opening designated by the numeral 43 extending therethrough. Openings 43 are arranged in aligned relation to enable receiving a hinge pin 44 therethrough.

Cover 32 has a pair of parallel outwardly extending integral projections each designated by the numeral 46 and each extending from a side edge thereof. Each projection 46 has an opening designated by the numeral 47 extending therethrough and openings 47 are also arranged in aligned relation.

Cover 32 is placed in position so that its projections 46 are arranged adjacent lugs 42 and so that openings 43 and 47 are arranged in aligned relation. A hinge bolt or pin 44 is provided and inserted through openings 43 and 47 to fasten cover 32 to housing 25 in a hinged manner. Hinge pin 44 is held in position in any suitable manner as by staking, use of a split ring, or the like.

Urging means is provided acting between housing 25 and cover 32 to hold cover 32 substantially on edge and normal to its normally closed position once the attaching means is released from cover 32. The urging means in this example of the invention comprises a coiled spring designated by the numeral 52 and as will be seen in FIGURES 4 and 5 of the drawings, coiled spring 52 causes lid 32 to be raised substantially vertically so that it is easily visable by a using operator standing at ground level. Thus, as seen in FIGURE 5 with vent device 20 adjacent cylindrical side wall 22, the line of sight designated by the numeral 54 of a using operator standing at ground level is such that the comparatively large area cover 32 is easily seen. The vertical position of cover 32 signifies that a high pressure condition has previously occurred in tank 21.

While it may be desirable in some applications of this invention to provide special stop means so that spring 52 will hold cover 32 substantially vertically against such special stop means, in this example of the invention cover 32 is held substantially vertically by engaging the inside surface means 60 on a pair of upwardly extending lugs 61 used to support breakable bar means 63 comprising vent device 20, see FIGURE 4.

As previously mentioned, the attaching means for holding cover 32 in its normally closed position comprises a plurality of attaching means in this example of the invention and such plurality of attaching means include elongated breakable bar means or breakable bar 63 which is pivotally mounted on a pivot pin 64 supported on lugs 61. As seen particularly in FIGURE 2 of the drawings, bar 63 is pivotally mounted adjacent hinge means 40 and such bar extends across the central portion of cover 32 so that its opposite bifurcate end is arranged adjacent a second position shown at 66 on housing 25 and such second position is substantially opposite hinge means 40 and, of course, diametrically opposite its pivot pin 64.

Bar 63 has a central projection designated by the numeral 70 which projects downwardly below its central portion and central projection 70 is adapted to lie immediately adjacent the center of cover 32. The opposite end of bar 63 is held in position against housing 25 by suitable breakable attaching link means shown as a breakable attaching link 72 and breakable pin means shown as a breakable pin 73 which is adapted to engage attaching link 72 and the opposite or swinging bifurcate end 74 of breakable bar 63.

Breakable attaching link 72 is pivotally mounted on a lug 75 extending upwardly from housing 25 and attaching link 72 is pivotally mounted on lug 75 using a suitable pivot pin 76. Link 72 in this example of the invention has holding means at its swinging end comprising a hooking end portion which is substantially C-shaped and designated by the numeral 80. C-shaped hooking end 80 is adapted to be placed around breakable pin 73 with pin 73 inserted through a pair of cooperating aligned openings each designated by the numeral 81 and provided in each leg of bifurcate end portion 74 of elongated breakable bar 63.

Thus, as seen in FIGURE 2 of the drawings, breakable pin 73 is inserted through openings 81 in bifurcate end 74 of bar 63 and the hooking C-chaped end 80 of breakable attaching link 72 is hooked therearound to thereby hold cover 32 firmly in position over the large area vent 26 provided in housing 25 of vent device 20. A pair of cotter pins each designated by the numeral 83 prevent axial movement of pin 73.

Cover 32 is thus held in position on vent device 20 by a plurality of three breakable attaching means comprising a breakable bar 63, a breakable link 72, and a breakable pin 73. Such breakable attaching means or attaching components are designed such that in the event of excessive pressure buildup within storage tank 21 a breakage of one of such components will allow cover 32 to open in a hinged manner and provide a large area vent to allow escape of vapors from within storage tank 21.

Cover 32 of this example has its inwardly projecting flange 33 constructed so that it corresponds in peripheral outline to cylindrical bore 26 as previously mentioned. Bore 26 in this example of the invention has frictionless lining means lining its inside surface and in this example of the invention such frictionless lining means comprises a Teflon lining 85.

Teflon lining 85 assures that cover 32 is free to move in a hinged manner solely as a function of pressure within storage tank 21 by preventing adjoining component parts from sticking together. It will be appreciated that sticking could occur due to adhesive tendencies between adjoining parts or due to corrosion between adjoining component parts especially after extended use over a period of years, for example.

In this example of the invention, annular groove means shown as an annular groove 86 is provided extending around flange 33 of cover 32. Annular groove 86 has O-ring means shown as an O-ring 90 inserted therein and O-ring 90 provides an annular line contact and hence an annular line seal between cover 32 and the substantially frictionless Teflon lining 85. Thus, it will be appreciated that with this line contact cover 32 is free to move as a function strictly of pressure within the tank and is not adversely affected by any tendency of cover 32 to stick in position due to some undesirable corrosive condition or other sticking condition.

Although in this example an O-ring 90 is used in association with Teflon lining 85 to provide a contact surface of minimum area, it will be appreciated that flange 33 could be held in sealed relation against Teflon lining 85 without requiring an O-ring seal and such arrangement would provide effective normal sealing and yet assure that cover 32 is free to move without sticking in the event of excessive pressure buildup within storage tank 21.

Elongated bar 63 in this example of the invention has threaded openings means extending through its central portion substantially transverse to its elongated axis and such threaded opening means is designated by the numeral 92. Screw means shown as a headless screw 93 is provided and adapted to be threaded through threaded opening 92 so that it extends downwardly beneath the lower projecting portion 70 of elongated bar 63. Screw 93 assures that upon assemblying vent device 20 and properly installing breakable bar 63, breakable link 72, and breakable pin 73 in position screw 93 is threaded snugly against the top surface shown at 94 of cover 32 to assure excessive pressure within storage tank 21 is transmitted immediately to the breakable attaching components without lost motion and without any possibility of partial relief from within storage tank 21 so as to, in effect, reduce the effectiveness of the unique breakable attaching components used on the emergency vent device of this invention.

Screw 93 has a height which is less than the corresponding height of threaded opening 92 so that upon threading screw 93 beneath the top surface of breakable bar 63 the upper portion of the threaded opening 92 above the top surface of screw 93 cooperates with such screw to define a well which is adapted to be filled with a material such as a liquid plastic material, for example, which solidifies upon setting and prevents tampering with the amount of extension of screw 93 beneath elongated bar 63.

The use of screw 93 better enables vent device 20 to be constructed without particular concern for the cooperating mating relationship of bar 63, link 72, and pin 73 inasmuch as any excessive mismatching or slack provided between adjoining components can be taken up by screw 93 to thereby render vent device 20 completely effective under all conditions.

The unique manner in which vent device 20 operates in a foolproof manner will now be explanied in detail in connection with FIGURES 3–9 of the drawings. Thus, as seen in FIGURE 3 device 20 is fixed in position on top wall 23 of storage tank 21 and with the breakable attaching means comprised of breakable bar 63, breakable link 72, and breakable pin 73 properly installed in position.

As the pressure in storage tank 21 increases to approximately 2 to 2½ pounds per square inch, for example, breakable pin 73 breaks first causing breakable arm 63 and cover 32 to swing upwardly as shown by dotted lines in FIGURE 4 of the drawings to provide the large area vent for storage tank 21. Cover 32 swings to a substantially vertical position so that it engages surfaces 60 provided on upwardly projecting lugs 61 and in such substantially vertical position an observer may easily view cover 32 from the ground as illustrated in FIGURE 5.

A using operator may in his anxiety to reclose cover 32 and perhaps lacking the necessary pin 73 may substitute much stronger member for breakable pin 73. For example, the using operator may insert a nail or steel rod in position in place of breakable rod 73 and such steel rod is indicated by the numeral 95 in FIGURES 6 and 7 of the drawings. Obviously, this is an undesirable error; nevertheless, in the event that it happens breakable link 72 is constructed and arranged so that it will then break upon subsequent excessive buildup of pressure within storage tank 21.

Breakable link 72 is constructed and arranged so that it will shear approximately adjacent the inner end of its C-shaped end 80 as shown at 96. FIGURE 6 of the drawings shows breakable link 72 starting to shear at 96 in its solid line position and in the dotted line position shows such link completely broken and cover 32 and breakable arm 63 moving upwardly in the same manner as previously described in connection with the breaking of breakable pin 73 and shown in FIGURE 4. The pressure within tank 21 at which link 72 breaks is generally of the order of 3 to 3½ pounds per square inch, for example.

However, the problem of providing a large area vent to relieve excessive pressure buildup within a storage tank for flammable liquids is a very serious one and while under ordinary circumstances it may be adequate to provide a double safety device, it is considered better practice to provide a vent device which provides what amounts to three independent safety features (i.e. vent cover release means) each assuring the provision of a large area emergency vent.

Thus, a using operator lacking the necessary components of the time to obtain such components may seal or clamp breakable bar 63 in position and once again close cover 32 using unauthorized parts and fasten outer end portion 74 of breakable bar 63 to housing 25 using a wire 100, see FIGURE 7. Of course, it is an error on the part of an operator to do this; nevertheless, in the event that it occurs a subsequent increase in pressure in tank 21 will cause breakable bar 63 to crack as shown at 101 in FIGURE 7 and then upon completely breaking apart allowing cover 32 to move upwardly in a manner as previously described in connection with the other two breakable members 72 and 73 and allow cover 32 to assume a substantially vertical position and thereby vent tank 21 to atmosphere.

As seen particularly in FIGURE 8 of the drawings, threaded opening 92 provided in the central portion of breakable bar 63 reduces the cross-sectional area of such bar a substantial amount and provides a weak area in the center of bar 63 causing the bar to break at that location. The reduced width of bar 63 on each side of opening 92 is designated by the numeral 102 in FIGURE 8 of the drawings.

Breakable bar 63 of this example is constructed and arranged so that its weakened section breaks with a pressure buildup within storage tank 21 generally of the order of 5 to 5½ pounds per square inch.

Under normal conditions cover 32 is kept closed to keep the amount of vent provided for storage tank 21 at a minimum. It will be appreciated that under normal standard atmospheric conditions at a given locality it is preferable that the pressure within storage tank 21 be controlled comparatively accurately at a pressure of about ½ pound per square inch. This small pressurization of tank 21 assures that losses of flammable liquid due to vaporization are kept at a minimum. This explains why it is preferable to keep vent device 20 closed at all times except during an emergency and explains why using operators are generally very anxious to close an open vent as quickly as possible even without proper components. The loss of flammable liquid from a large area vent can be quite substantial—due to vaporization.

The structural integrity of a normal storage tank similar to storage tank 21 is such that such tank is normally rated at a pressure generally of the order of 6 pounds per square inch and such tanks are tested at considerably higher pressures of the order of 10 pounds per square inch. Thus, it is seen that breakable components 63, 72, and 73 break within the normal operating pressure of the exemplary storage tank 21 also the test pressure at which storage tank 21 is subjected provides an added margin of safety under all operating conditions.

In each instance, breakable components 63, 72, and 73 are preferably made of a material which is non-elastic in nature and the material is generally classified as being brittle. Thus, it will be appreciated that upon the application of a predetermined force thereagainst caused by pressure buildup within tank 21 the particular breakable member will break in a brittle manner without elongation, or the like, to thus provide a large vent immediately upon reaching the predetermined pressure within tank 21.

In this example of the invention breakable pin 73 is preferably made of a carbon material and in one exemplary application of this invention a carbon pin manufactured by the St. Mary's Carbon Company of St. Mary's, Pa. was utilized and such carbon pin was made from a material having the trade designation of P12. Of course, it will be appreciated that the particular diameter and length of carbon pin utilized will vary with the particular size of emergency vent 26 and cover 32 and the desired particular pressure at which carbon pin 73 is to break. In any event, it will be appreciated that the use of a carbon material such as P12 provides an effective break pin of the character required by this invention.

Breakable link 72 is preferably made of any suitable brittle material as previously mentioned. In one exemplary application of this invention a breakable link 72 made from a bronze alloy having the trade designation of CT100 and manufactured by the Pres-Met Corporation of Wooster, Mass. was successfully used. As indicated previously in connection with the required size of rod 73 the dimensions of beakable link 72 are worked out in each application based on the mechanical character of cooperating components, the size vent, and the tank pressure at which link 72 is required to break.

Breakable bar 63 is also made of a suitable breakable material which will break without elongation and break substantially brittley as previously mentioned. In one application of this invention bar 63 was made of cast iron and provided the necessary characteristics to assure that proper breaking is provided under the pre-established conditions.

As seen particularly in FIGURE 3 of the drawings, it will be noted that breakable pin 73 is preferably loaded as a simple beam. Thus, breakable pin 73 is supported at its opposite ends and a load is provided at its central portion which, in effect, with excessive pressure within storage tank 21 causes breakable pin 73 to break in the middle.

Terms such as "upwardly," "downwardly," "vertically," "sides," "top," "top wall," have been used in this disclosure of the invention merely to describe the particular arrangement of various components as illustrated in the drawings and such terms should not be considered as limiting the scope of this invention in any way.

Thus, it is seen that a foolproof emergency vent device has been provided which is of simple and economical construction and which has cover means providing a large area emergency vent which is held in position by a plurality of breakable attaching means.

While the form of the invention now preferred has been disclosed as required by statute, other forms may be used, all coming within the scope of the claimed subject matter which follows:

What is claimed is:

1. A fluid pressure operated vent device for a fluid tank comprising housing means having bore means extending therethrough and defining a comparatively large area emergency vent, fastening means for fastening said housing on said tank with said emergency vent in flow communication with the interior thereof, cover means for sealing said vent under normal conditions, hinge means attaching said cover means to said housing means in a hinged manner at a first position about the periphery of said cover means and urging means acting between said housing means and said cover means to hold said cover means substantially on edge and normal to its normally closed position after breaking of said attaching means, and breakable attaching means for attaching said cover means in sealed relation over said vent, said attaching means being adapted to break in the event of excessive pressure build up within said tank to provide said emergency vent, said breakable attaching means comprising a plurality of separate, unlike, breakable attaching means each constructed to break at a different predetermined pressure level within said tank, whereby said plurality of breakable attaching means assure that in the event of error by a using operator in improperly reattaching said cover means after an emergency venting condition said emergency vent is always provided in the event of a subsequent excessive pressure condition within said tank.

2. The device as set forth in claim 1 in which said bore means has frictionless lining means lining its surface means, and said cover means has inwardly projecting peripheral flange means corresponding in peripheral outline to said bore means and adapted to be placed against said lining means in sealed relation, said lining means assuring said cover means is free to move as a function of pressure within said tank and without sticking.

3. The device as set forth in claim 2 in which said flange means has annular groove means extending therearound and O-ring means carried within said groove means, said O-ring means providing an annular line contact and seal between said cover means and said frictionless lining means to further assure said cover means is free to move as a function of pressure within said tank.

4. A fluid pressure operated vent device for a fluid tank comprising, housing means having bore means extending therethrough and defining a comparatively large area emergency vent, fastening means for fastening said housing on said tank with said emergency vent in flow communication with the interior thereof, cover means for sealing said vent under normal conditions, hinge means attaching said cover means to said housing means in a hinged manner at a first position about the periphery of said cover means and urging means acting between said housing means and said cover means to hold said cover means substantially on edge and normal to its normally closed position after breaking of said attaching means, and breakable attaching means for attaching said cover means in sealed relation over said vent, said attaching means being adapted to break in the vent of excessive pressure build up within said tank to provide said emergency vent, said breakable attaching means comprising a plurality of breakable attaching means each constructed to break at a different pressure level within said tank, said plurality of attaching means comprising breakable attaching link means pivotally mounted on said housing means at a second position substantially opposite said first position and breakable pin means cooperating with said breakable attaching link means to hold said hinged cover means closed, whereby with excessive pressure within said tank and pin means breaks first enabling said cover means to swing open to vent said tank and in the event of error by a using operator in replacing said pin means with a comparatively stronger member to reclose said cover means said attaching link means breaks next again allowing said cover means to swing open to prevent subsequent excessive pressure within said tank.

5. A fluid pressure operated vent device for a fluid tank comprising, housing means having bore means extending therethrough and defining a comparatively large area emergency vent, fastening means for fastening said housing on said tank with said emergency vent in flow communication with the interior thereof, cover means for sealing said vent under normal conditions, hinge means attaching said cover means to said housing means in a hinged manner at a first position about the periphery of said cover means and urging means acting between said housing means and said cover means to hold said cover means substantially on edge and normal to its normally closed position after breaking of said attaching means, and breakable attaching means for attaching said cover means in sealed relation over said vent, said attaching means being adapted to break in the event of excessive pressure build up within said tank to provide said emergency vent, said breakable attaching means comprising a plurality of breakable attaching means each constructed to break at a different pressure level within said tank, said plurality of breakable attaching means comprising, elongated breakable bar means having one end pivotally mounted on said housing means adjacent said first position and extending completely across the central portion of said cover means so that its opposite end is arranged adjacent a second position on said housing means substantially opposite said first position, breakable attaching link means pivotally mounted on said housing means at said second position and having holding means at its swinging end, and breakable pin means cooperating between said holding means and said opposite end of said bar means to hold said bar means in position across the top surface of said cover means, whereby the excessive pressure within said tank said pin means breaks first enabling said cover means to swing open to vent said tank, in the event of error by a using operator in replacing said pin means with a comparatively stronger member to reclose said cover means said attaching link means breaks next to prevent subsequent excessive pressure within said tank, and in the event of further error by a using operator in again reclosing said cover means by fastening said elongated bar means using means stronger tthan said breakable attaching link means or said breakable pin means a subsequent excessive pressure build up within said tank causes said breakable bar means to break making it virtually impossible to further reclose said cover means without using proper components and thereby provide an essentially foolproof emergency vent for said tank.

6. The device as set forth in claim 5 in which said elongated breakable bar means has threaded opening means through its central portion extending substantially transverse to its elongated axis, said threaded opening means reducing the cross-sectional area of said bar means to effectively define a break area, and said device further comprising screw means threaded through said threaded opening means so as to engage top surface means of said cover means so that with said breakable elongated bar means, breakable link means, and breakable pin means in position said cover means is snugly engaged by said screw means to assure excessive pressure within said tank is transmitted without lost motion to said breakable means.

7. The device as set forth in claim 6 in which said screw means has a threaded height which is less than the corresponding height of said threaded opening and said screw is threaded beneath top surface means of said breakable bar means so that the upper portion of said threaded opening means above said screw means cooperates with top surface means of said screw means to define a well which is adapted to be filled with a material which solidifies to prevent tampering with the extension of said screw means beneath said elongated bar means.

8. The device as set forth in claim 6 in which said bore means has Teflon lining means lining its surface means and said cover means has inwardly projecting peripehral flange means corresponding in peripheral outline to said bore means and adapted to be placed against said Teflon lining means in sealed relation, said Teflon lining means assuring said cover means is free to move as a function of pressure within said tank and without sticking.

References Cited

UNITED STATES PATENTS

| 2,291,374 | 7/1942 | Canfield. |
| 2,487,104 | 11/1949 | Cooper. |
| 3,104,225 | 9/1963 | Benedetto _____ 220—63 X |
| 3,349,561 | 10/1967 | Cottrell. |

FOREIGN PATENTS 265,376  3/1950  Switzerland.

RAPHAEL H. SCHWARTZ, *Primary Examiner.*